United States Patent [19]

Mooney et al.

[11] 4,042,262
[45] Aug. 16, 1977

[54] SWIVEL COUPLING MEANS FOR ELECTRICAL CONDUITS AND THE LIKE

[75] Inventors: Thomas C. Mooney, Mount Sinai; Padej Gajajiva, Elmhurst, both of N.Y.

[73] Assignee: I-T-E Imperial Corporation EFCOR Division, East Farmingdale, N.Y.

[21] Appl. No.: 669,444

[22] Filed: Mar. 23, 1976

[51] Int. Cl.² ............................................. F16L 17/06
[52] U.S. Cl. .................................... 285/98; 285/281; 285/328; 285/330; 285/382
[58] Field of Search .................. 285/18, 23, 281, 282, 285/272, 278, 382, 328, 330, 298, 302, 98

[56] References Cited

U.S. PATENT DOCUMENTS

| 958,927 | 5/1910 | Kelly | 285/328 X |
|---|---|---|---|
| 1,238,994 | 9/1917 | Erickson | 285/330 X |
| 2,016,262 | 10/1935 | Arey et al. | 285/330 |
| 2,155,008 | 4/1939 | Elliott | 285/18 |

FOREIGN PATENT DOCUMENTS

| 470,181 | 12/1950 | Canada | 285/281 |
|---|---|---|---|
| 857,179 | 12/1960 | United Kingdom | 285/282 |

Primary Examiner—Dave W. Arola
Attorney, Agent, or Firm—Friedman, Goodman & Teitelbaum

[57] ABSTRACT

A coupling member for joining two generally coaxial tubular members, for example electrical conduits, fittings and the like, is disclosed. The coupling member includes an elongated sleeve having axially extending threads formed internally at one end thereof and an outwardly flared, deformable section at the end thereof opposite the threads. The deformable section has an inwardly directed lip for engaging an annular groove formed on the outside surface of one of the members that is to be coupled. The other member that is to be coupled is provided with external threads that are arranged to matingly engage the internal threads on the sleeve. Interface surfaces for temporarily securing the sleeve and the second one of the two members to be joined are provided so that the sleeve does not rotate while the first one of the two members is being engaged therewith. The sleeve is axially movable relative to the second one of the two members to be joined in order to permit relative rotational movement between the two tubular members after the coupling thereof has been completed. The interface surfaces are defined by cooperating tapered surfaces, where the tapered surfaces may be knurled, or a ring-shaped member interposed between the confronting ends of the two members.

8 Claims, 11 Drawing Figures

SWIVEL COUPLING MEANS FOR ELECTRICAL CONDUITS AND THE LIKE

BACKGROUND OF THE INVENTION

This invention relates generally to couplings for electrical conduits or the like and more particularly to an improved swivel connector.

In attaching a connector for electrical conduits containing electrical conductors to outlet boxes, limit switches, control boxes, etc., the connector must be threaded tightly, but not too tightly or the threads would strip. It is also a common requirement of the coupling means of the type to which the present invention is directed, that a seal be provided as well as good electrical grounding. In association with many types of tools, machinery, equipment, etc., liquids are used for lubrication, cooling, cleaning and cutting. The liquids are often splased on the electrical connections. Additionally, moisture in the air could enter the conduit via the smallest opening in the connector or coupling and be condensed and trapped in threads therein, thus enhancing corrosion and poor electrical connections. Any liquid that is present in the conduit could possibly short out the conductors.

Examples of prior art in the general field to which the present invention is directed are disclosed in U.S. Pat. Nos. 3,710,911 and 3,828,117 as well as Canadian Pat. No. 944,404. A feature common to the two U.S. Patents. is a tubular body member having an inner sleeve of rigid, plastic material which protrudes slightly beyond the ends of a body member. A pair of nuts are slidably mounted on the outer, peripheral surface of the tubular body member between outwardly directed radial flanges that are adjacent opposite ends of the body member. The nuts are threaded onto the ends of axially opposed conduits. The Canadian patent, which is particuarly directed to an angled connector, utilizes the concept of a rigid plastic, inner sleeve and similarly provides a liquid-tight connection. The three patents discussed hereinabove provide a structure that may be readily disassembled. In addition, the structure in the three prior art patents just discussed provide a swivel characteristic wherein a length of conduit may be connected without having to rotate any section of the conduit while still providing seal means that will assure a fluid-tight coupling.

SUMMARY OF THE INVENTION

The present invention, as will be described more fully hereinafter, provides an inexpensive coupling that is permanently installed onto the end of a rigid conduit. In one aspect, the coupling comprising the present invention is defined by an elongated sleeve having internal threads at one end thereof. The opposite end of the sleeve is deformable and is initially flared outward. A radially inwardly extending lip is formed integrally with one end of the deformable section and is adapted to engage an annular groove formed on the exterior surface of a length of conduit. When the external groove is formed on the conduit, it will be evident that conventional threads are not required at that end of the conduit. The opposite end of the sleeve is internally threaded so as to receive the threaded end of the conduit. An annular seal ring may be provided between the confronting ends of the two members that are to be joined.

An important aspect of the present invention is the provision of means for temporarily securing the sleeve to the second one of the members that are to be joined so that the sleeve does not rotate while the first one of the members to be joined is being engaged therewith. However, in accordance with the present invention, the sleeve is axially movable relative to the second one of the two members that are to be joined in order to permit relative rotational movement between the tubular members after the coupling thereof has been completed.

From the foregoing it will be appreciated that, instead of threading both ends of the conduit, the manufacturer can save time and labor costs by threading only one end and by grooving the other end. The grooved end of the conduit is then inserted into the sleeve and the sleeve is deformed by the application of an external force, such as by rolling operation, so that the flared end of the sleeve returns to and remains in a position in engagement with the external groove. The interface means, which may be in the form of cooperating tapered surfaces or in the form of a tooth and mating slot arrangement, temporarily restrain the sleeve from rotating while one of two members that are to be joined are threaded therein. After the sleeve is coupled to the first member to be joined, the sleeve may be moved axially so as to space apart the cooperating interface means to thereby permit relative rotational movement between the two members that have been coupled to each other.

When a seal ring is employed, in a manner to be described more fully hereinafter, a complete fluid-tight seal is provided. At the same time, and because the two conduits are pulled towards each other during the tightening thereof, there will be a good ground continuity path through the coupling sleeve.

While the present invention will be described and illustrated in the environment of conduits having adjacent threaded and unthreaded ends, it will be appreciated that the present invention may also be utilized with a pair of coaxial conduits wherein both adjacent ends are threaded. In such an application, the present invention defines a fitting having an annular groove on the outside surface thereof and threads on the inside surface thereof at least at both ends. When used as a fitting, all of the attributes of the coupling member described hereinabove are present. That is, the fitting will have an annular groove on the outside surface thereof and will be used, in combination with a sleeve having a deformable section including an inwardly directed lip for engaging the annular groove on the outside surface of the fitting. In accordance with the present invention, interface means as described above would be provided in order to permit cooperation between the fitting and coupling member. When an intermediate conduit or fitting is utilized, the present invention can be used on existing threaded conduits without modifications thereof.

Accordingly, it is a primary object of the present invention to provide an improved coupling for joining two generally coaxial tubular members such as electrical conduits, fittings or the like.

It is an important object of the present invention to provide an improved coupling, as described above, that is relatively inexpensive to manufacture.

A further object of the present invention is to provide an improved coupling, as described above, having the swivel characteristics of the prior art.

Another object of the present invention is to provide an improved coupling, as described above, having means for providing fluid tight connection between adjacent conduit sections.

An additional object of the present invention is to provide an improved coupling, as described above, that may be used on existing conduit without modification thereto.

A further object of the present invention is to provide an improved coupling, as described above, that is adapted for use on a length of conduit having one externally threaded end and one externally grooved end.

Yet another object of the present invention is to provide an improved coupling, as discribed above, wherein means are included for temporarily securing the coupling to one of the two members that are to be joined so that the coupling does not rotate while the first one of the two members to be joined is being engaged therewith.

A still further object of the present invention is to provide an improved coupling, as described above, wherein means for temporarily securing the sleeve to the second one of the two members to be joined comprises an annular ring, which, in combination with the end of the second member to be joined defines cooperating interfitting surface means.

Still another object of the present invention is to provide an improved coupling, as described above, wherein the interconnecting surface means are defined by at least one cooperating tooth and slot arrangement.

An additional object of the present invention is to provide an improved coupling, as described above, wherein there are a plurality of the tooth and slot arrangements.

Yet another object of the present invention is to provide an improved coupling, as described above, wherein a sealing ring that is utilized between the confronting ends of the two tubular members that are to be joined is provided with at least one axially extending tooth and wherein the end of the second member that is to be joined is provided with at least one axially extending slot that is arranged to receive the tooth formed on the annular sealing ring.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
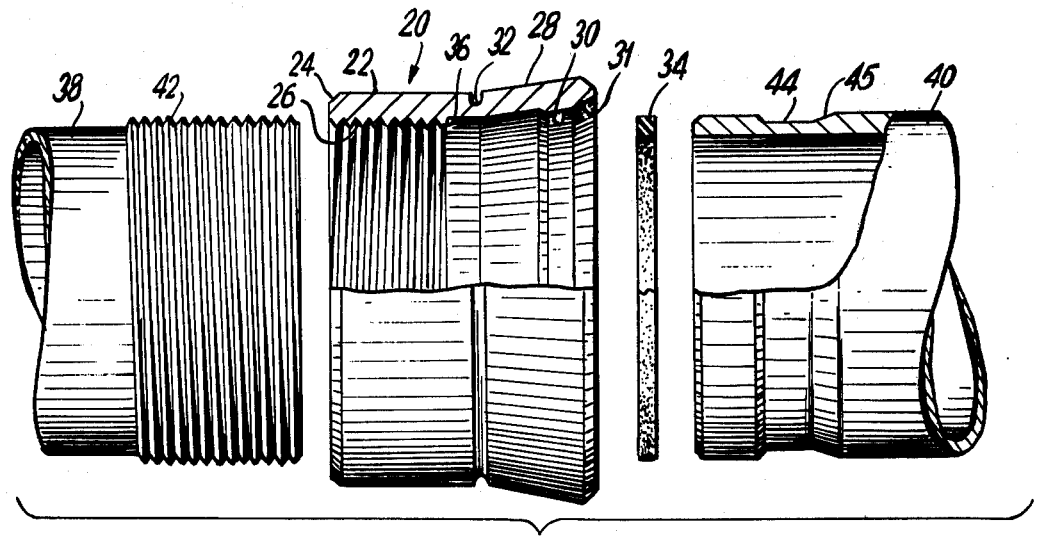
FIG. 1 is an exploded side elevational view, partially in section, illustrating the coupling comprising the first embodiment of the present invention.
Figure 2:
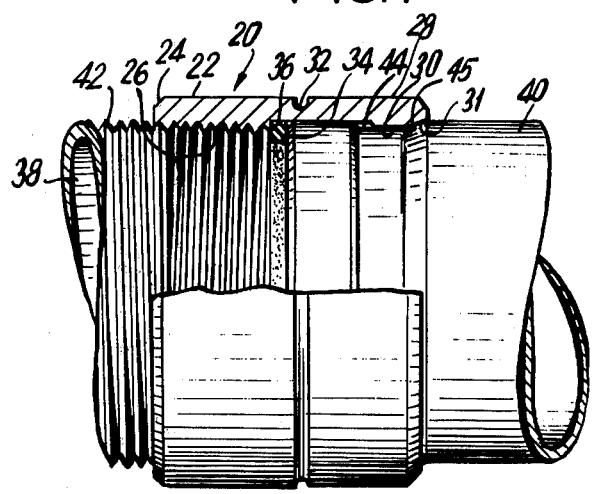
FIG. 2 is a side elevational view, partially in section, illustrating the coupling of FIG. 1 in a partially assembled condition.
Figure 3:
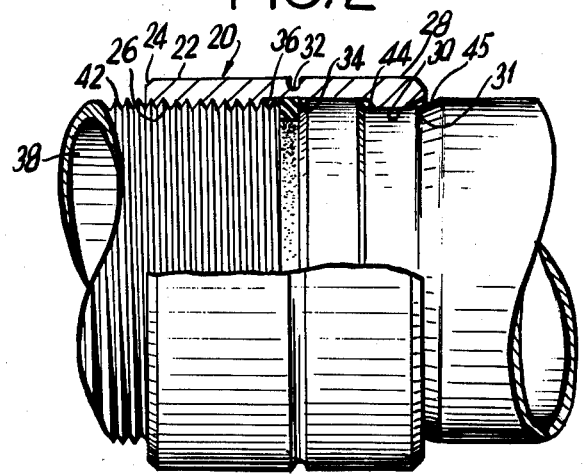
FIG. 3 is a side elevational view, partially in section, illustrating the structure shown in FIG. 2 in the fully assembled condition.

Referring now to FIGS. 1-3 there is shown one embodiment of the present invention. A coupling generally designated by the reference character 20, which may be made from low carbon steel tubing, comprises an elongated sleeve 22 having a first end 24 which is provided with internal threads 26. The other end 28 of the sleeve 22 is flared outwardly and is provided with a radially inwardly directed lip 30 which, in the embodiment illustrated, extends completely around the end 28. For purposes to be described hereinafter, the axially outer end (to the right as seen in FIG. 1) of the lip 30 is provided with a tapered section 31.

It will be further seen in FIGS. 1-3 that the outwardly flared end 28 starts at an annular groove 32 that is formed on the outside surface of the sleeve 22. In addition, and if a fluid tight connection is required, an annular sealing ring 34 may be placed within the sleeve 22. The sealing ring 34, which may be made of nylon or the like, abuts the seat 36 that is formed at the right hand end of the threads 26 as shown in FIG. 1.

The coupling 20 may be used for joining two generally coaxial tubular members such as conduits 38 and 40, which are shown in FIGS. 1-3. It will be noted that the external surface of the end of the conduit 38 is provided with threads 42 in a conventional manner. These same threads may be eliminated from the end of the conduit 40 and may be replaced by an external groove 44. For purposes to be described hereinafter, one end wall 45 of the groove 44 is tapered at approximately the same angle as the taper 31 formed on the lip 30.

As shown in FIG. 2, the grooved end of the conduit 40 is inserted into the outwardly flared end 38 of the coupling 20 and stops against the seal ring 34. By a rolling operation or by passing the coupling 20 through an appropriate female die (not shown), the flared end 28 will be closed such that it achieves the configuration shown in FIG. 2 to thereby capture the sealing ring 34 and the conduit 40.

In this condition, the lip 30 will be loosely engaged in the groove 44 and the tapered portion 31 of the lip 30 will be in tight frictional engagement with the tapered end wall 45 of the groove 44. Thus, when the threads 42 of the conduit 38 matingly engage the threads 26 of the sleeve 22, the conduit 38 will push or hold the tapered portion 31 against the tapered end wall 45 so that there will be no relative rotation between the sleeve 22 and the conduit 38. It will be appreciated that, because of the construction illustrated and described, it will no longer be necessary to either hold or clamp the sleeve 22 against rotation while the conduit 38 is being threaded therein. This is particularly advantageous when the present invention must be utilized in severely cramped locations or when the person performing the assembly cannot hold the sleeve 22 for any reason. As the conduit 38 is further threaded into the sleeve 22, a time will be reached when further tightening or insertion of the conduit 38 cannot be achieved without the axial movement of the sleeve to the left such as is shown in FIG. 3. At this time, the sealing ring will be tightly clamped and the tapered surface 31 and 45 will be axially spaced apart from each other so that relative rotational movement between the conduits 38 and 40 will be permitted without the separation thereof. At the same time, the lip 30 will be in engagement with the basewall of the groove 44, as shown in FIG. 3, to thereby provide a good electrical ground continuity path while permitting rotation therebetween.

It will be appreciated that all of the characteristics of the prior art have been provided, with the exception of the ability to connect lengths of conduit that are slightly misaligned. That is, with the present invention, it is possible to achieve the swivel characteristics as well as the fluid-tight seal at a lower cost than was possible with the prior art. It should be noted at this time, that, should it not be necessary to provide a fluid-tight seal, the sealing ring 34 may be omitted. It should also be noted at this time that by the provision of the cooperating, tapered surface on the coupling member and one of the conduits to be joined, it is no longer necessary to hold the coupling member against rotation while the other conduit is being threaded therein.

Stated another way, a gently tapered surface 45 is machined on the right hand wall of the annular groove 44 on the conduit 40 and a matching tapered surface 31 is machined on the radially inwardly directed lip 30 of the sleeve 22. Hence, when the coupling member 20 is assembled on the conduit 40 and a force is exerted on the threaded end of the coupling member 20 by the conduit 38, the two corresponding tapers 31 and 45 will wedge together and effectively lock the coupling member 20 onto the conduit 40 and thereby prevent any relative rotation therebetween. Unlocking of the coupling member 20 from the conduit 40 may be achieved by exerting an axial push on the conduit 40 by the conduit 38 when fully engaged.

A modification of the first embodiment of the present invention is shown in FIGS. 4–7. Since almost all of the structure is almost exactly the same as in the first described embodiment, and the structure functions in a similar manner, a repetition thereof is not believed necessary. Where structure is substantially the same, primed reference characters are used. Where structure is identical, the same reference character is used.

Figure 4:
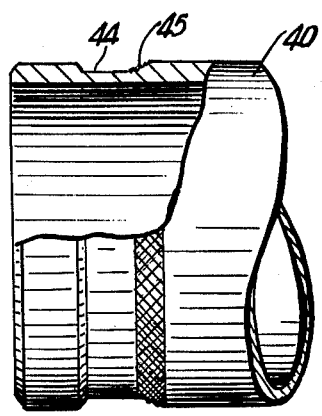
FIG. 4 is a side elevational view, partially in section, illustrating the end of one of the tubular members to be joined, with a modification of the structure shown in FIG. 1.
Figure 5:
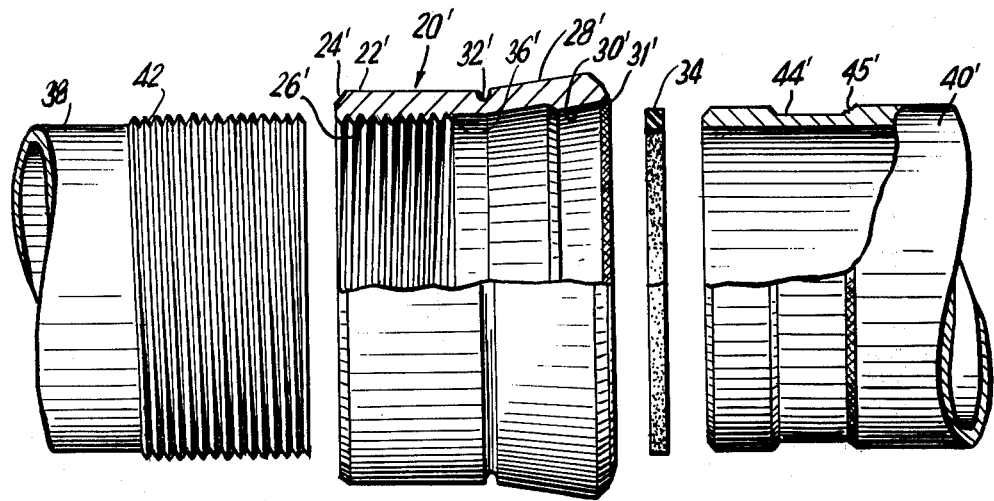
FIG. 5 is an exploded side elevational view, partially in section, illustrating the modification shown in FIG. 4.
Figure 6:
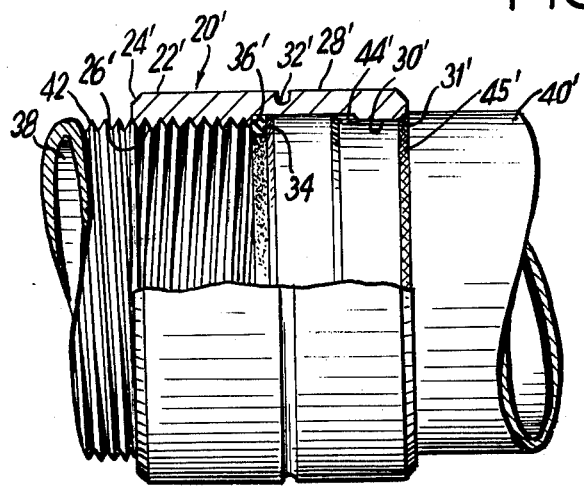
FIG. 6 is a side elevational view, partially in section, illustrating the modification of FIG. 4 and FIG. 5 in a partially assembled condition.
Figure 7:
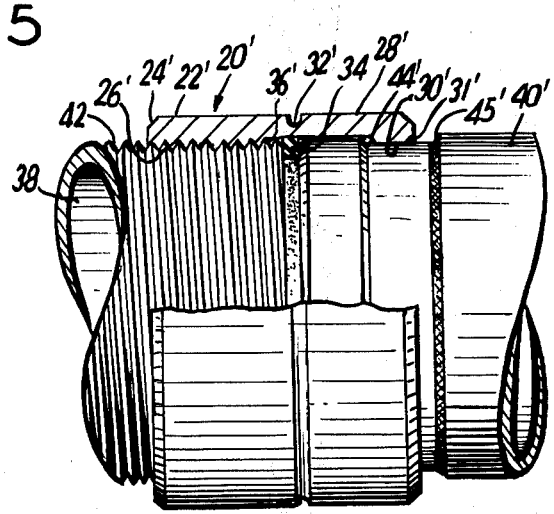
FIG. 7 is a side elevational view, partially in section, illustrating the structure shown in FIG. 6 but in the fully assembled condition.

The essential difference of the modification shown in FIGS. 4–7 over the first embodiment shown in FIGS. 1–3 resides in the configuration of the mating tapered surfaces. Surface 45, as shown in FIG. 4 and surfaces 31' and 45' as shown in FIGS. 5–7 are roughened as by knurling or the like. In the modification of the first embodiment, such as illustrated by FIGS. 5–7, the surfaces 31' and 45' are somewhat shorter in an axial direction as compared to tapered surfaces 31 and 45. It should be further noted that it is also within the scope of the present invention to provide roughened or knurled surfaces on the relatively long taper 45 shown in FIG. 4 in order to achieve a better locking effect with tapered surface 31, if this is required. Although not specifically illustrated, it is also within the scope of the present invention to roughen in any suitable manner the right hand end face of the sealing ring 34 that is in opposition and abutment with the left hand end of the conduit 40 as seen for example in FIGS. 1–3. Similarly, the right hand end face of the sealing ring 34', such as shown in FIGS. 5–7 may also be roughened in any suitable manner in order to further minimize the possibility of relative rotation between the coupling member 20 and the conduit 40 or the coupling member 20' and the conduit 40'.

Still another embodiment of the present invention is illustrated in FIGS. 8–11. Therein it will be seen that a coupling member 50 is provided, which may be fabricated from low carbon steel tubing. The coupling member 50 comprises an elongated sleeve 52 having a first end 54 which is provided with internal threads 56. The other end 58 of the sleeve 52 is flared outwardly and is provided with a radially inwardly directed lip 60, which, in the embodiment illustrated extends completely around the end 58.

Figure 8:
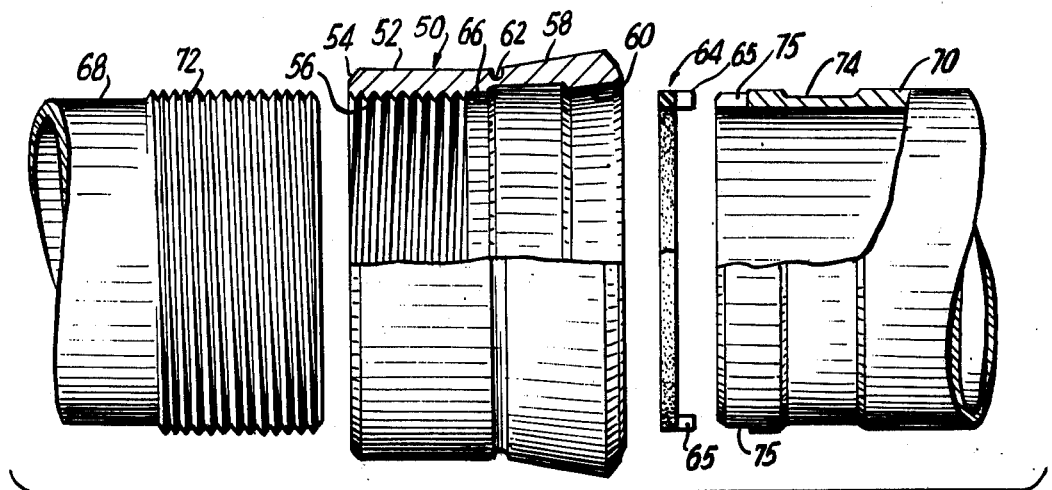
FIG. 8 is an exploded, side elevational view, partially in section, illustrating an alternative embodiment of the coupling comprising the present invention.
Figure 9:
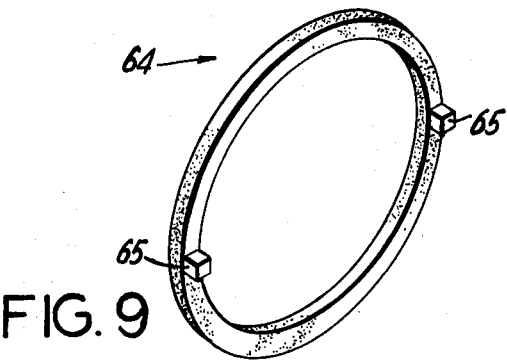
FIG. 9 is a perspective view illustrating one of the components shown in FIG. 8.

It will be further seen in FIG. 8 that the outwardly flared end 58 starts at an annular groove 62 that is formed on the outside surface of the sleeve 52. In addition, an annular sealing ring 64 may be press fit within the sleeve 52. The sealing ring 54, which may be made of nylon or the like is provided with at least one end and preferably two or more axially projecting tabs or teeth 65 and is adapted to abut a seat 66 that is formed at the right hand end of the threads 56 as shown in FIG. 8.

The coupling member 50 shown in FIG. 8 may be used for joining two generally coaxial tubular members such as conduits 68 and 70 which are shown in FIG. 8. It will be noted that the external surface of the end of the conduit 68 is provided with threads 72 in a conventional manner. The same threads may be eliminated from the ends of the conduit 70 and may be replaced by an external groove 74. In addition, the end of the conduit 70 having the annular groove 74, is also provided with at least one and preferably a plurality of axially extending slots 75 that are adapted to receive the tabs or teeth 65 formed on the right hand end face of the sealing ring 64 such as shown in FIGS. 8–11.

Figure 10:
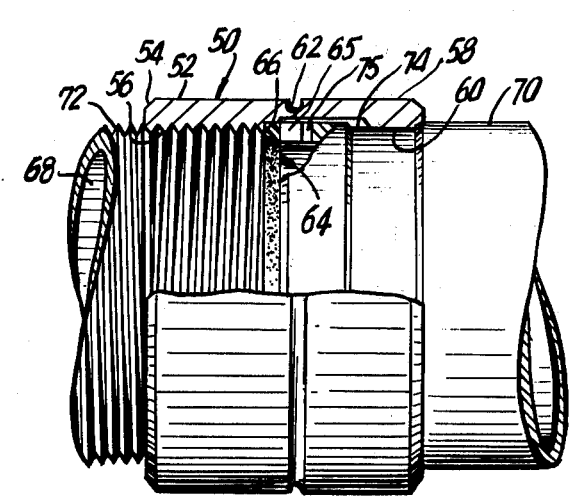
FIG. 10 is a side elevational view, partially in section, illustrating the embodiment of FIG. 8 in the partially assembled condition.

As shown in FIG. 8 the grooved end of the conduit 70 is positioned opposite and is adapted to be inserted into the outwardly flared end 58 of the coupling member 50 and, when so inserted, stops against the right hand end face of the sealing ring 64. A rolling operation or passing of the coupling through an appropriate female die (not shown) will close the flared end 58 of the coupling member 50 such as is shown in FIG. 10. This will serve to capture the sealing ring 64. It should also be noted that at this time the tabs or teeth 65 that project axially from the right hand end face of the sealing ring 64 will be positioned in the slots 75 formed in the left hand end face of the conduit 70. Since the sealing ring 64 is press fit into the coupling member 50, the interaction of the tabs or teeth 65 with the slots 75 will inhibit relative rotation between the coupling member 50 and the conduit 70 while the threads 72 of the conduit 68 are matingly engaging the threads 56 of the coupling member 50. The interlocked position of the tabs or teeth 65 with the slots 75 is shown in FIG. 10.

Figure 11:
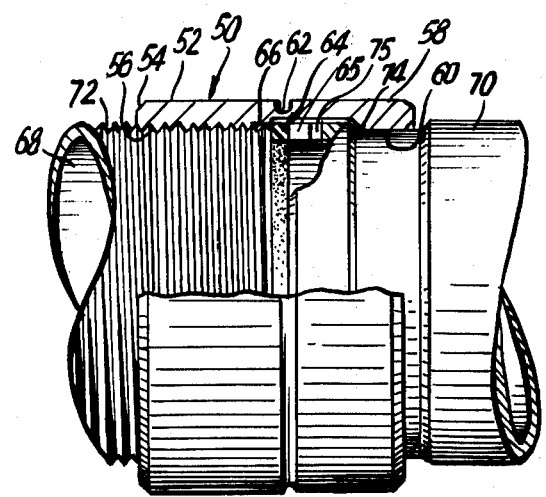
FIG. 11 is a side elevational view, partially in section, illustrating the structure shown in FIG. 10 but in the fully assembled condition.

It should also be noted that the radially inwardly extending lip 60 will be loosely engaged in the annular groove 74 so that relative rotation between the conduits 68 and 70 will be permitted when the conduit 70 is in the extreme right hand position such as shown in FIG. 11. At this time, the tabs or teeth 64 will still be engaged in the slots 75. However, the threaded end of conduit 68, when being fully engaged in the coupling member 50, will push the sealing ring 64 away from the seat 66 and out of the above-mentioned press fit relationship, so that the sealing ring 64 is now positioned in an enlarged groove formed internally in the coupling member 50, as shown in FIG. 11. Thus, the conduit 70 and sealing ring 64 connected thereto are free to rotate relative to the coupling member 50 and the conduit 68 connected thereto. The sealing ring 64 will still form a complete fluid-tight seal and there will be a good electrical continuity path since the radially inwardly directed lip 60 is still in engagement with the base wall of the annular groove 74 even though relative rotation is permitted therebetween.

From the foregoing it will be appreciated that an improved low cost coupling and assembly for conduits such as electrical conduits have been provide. The present invention provides all of the characteristics of the prior art with the exception of the ability to couple lengths of slightly misaligned conduits. By the use of the present invention relative rotation of the axially adjacent conduit is selectively prohibited at the time when the externally threaded conduit is being threaded into the coupling member. However, subsequent to the mating engagement of the externally threaded conduit and the coupling member, relative rotational movement between the coaxially coupled conduits is permitted by the sliding emgagement of the radially inwardly directed lip of the coupling member with the annular groove formed in the non-threaded conduit. In one embodiment of the present invention, the selective locking that prohibits relative rotation between the coupling member and the non-threaded conduit is achieved by mating tapers formed on the inwardly directed lip of the coupling member and the confronting sidewall of the annular groove in the non-threaded coupling member. As a modification of the first embodiment, the confronting and interacting tapered surfaces may be knurled. In an alternative embodiment of the present invention the selective locking feature of the present invention is achieved by the interaction of a tab or tooth member that is press fit into the coupling member and which engages axially extending slots formed in the end of the non-threaded conduit. Both embodiments of the present invention lend themselves to fluid-tight seals as well as providing a good electrical ground continuity path while still permitting relative rotation between the coaxially adjacent conduits.

As used herein, the term interface means generically refers to the tapered surfaces on the coupling member and on the non-threaded conduit as well as the knurled surfaces thereof. In addition, the term interface means is also generic to the cooperating tabs or teeth and slots formed in the coupling member and the non-threaded conduit.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:
1. An assembly adapted to be joined to a first elongated tubular member having external threads provided on one end thereof, said assembly comprising:
   a. a second elongated tubular member, said second tubular member having an annular groove provided on an outside surface thereof proximate one end thereof;
   b. an elongated hollow tubular sleeve;
   c. axially extending, internal threads provided within one end of said sleeve for engaging the externally threaded end of the first tubular member;
   d. a section integral with said sleeve at an opposite end thereof spaced from said internal threads;
   e. connecting means for engaging said annular groove provided on said section of said second tubular member to permit relative rotational movement between said sleeve and said second tubular member, whereby relative rotational movement is permitted between said first and second tubular members; said connecting means further permitting axial movement of said sleeve relative to said second tubular member along width of said annular groove;
   f. said connecting means including a lip extending radially inward from said section of said sleeve, said lip being disposed in said annular groove of said second tubular member, said lip having an axial width smaller than said width of said annular groove to permit said axial movement, said lip extending completely around an inside surface of said section of said sleeve;
   g. said section of said sleeve including means for permitting said section to be deformed from an initially flared outward condition into engagement with said groove, said section being maintained in a deformed condition absent an application of a further deforming force in an opposite direction so that said lip is prevented from leaving said groove after assembly;
   h. a second annular groove provided on an inside surface of said sleeve proximate an axially inner end of said internal threads, said section of said sleeve extending from proximate an axially inner end of said second groove adjacent to said internal threads;
   i. an annular end portion proximate said first-mentioned groove at said one end of said second tubular member extending radially outward into said second groove to permit said relative rotational movement, said annular end portion having an axial width smaller than width of said second groove to permit said axial movement; and
   j. interface means disposed between said sleeve and said second tubular member for temporarily locking said sleeve and said second tubular member together when a surface of said lip is disposed adjacent to a wall of said annular groove of said second tubular member so that said sleeve does not rotate while said first tubular member is being engaged therewith, whereby after engagement of said sleeve and said first tubular member has been completed, said sleeve is axially moved relative to said second tubular member so that said surface of said lip is spaced from said wall of said annular groove of said second tubular member to thereby permit the relative rotational movement between said first and said second tubular members.

2. An assembly according to claim 1, wherein said surface of said lip and said wall of said annular groove of said second tubular member are tapered and cooperate when in contact with each other to define said interface means.

3. An assembly according to claim 2, wherein at least one of said tapered surface and wall is knurled.

4. An assembly according to claim 2, wherein both said tapered surface and wall are knurled.

5. An assembly according to claim 1, wherein a seat is provided in said sleeve at said axailly inner end of said internal threads and an annular seal ring is positionable in said sleeve against said seat for abuttingly receiving said one end of said second tubular member, said annular seal ring and said one end of said second tubular member including a pair of cooperatingly opposed transverse surfaces to define said interface means when said ring is positioned in said seat and said one end bears against said ring.

6. An assembly according to claim 5, wherein one of said cooperating surfaces includes at least one axially extending slot with the other of said cooperating surfaces imcluding at least one axially extending tooth arranged to be received in said slot for engagement therebetween.

7. An assembly according to claim 6, wherein said tooth is formed on said ring and said slot is formed in said one end of said second tubular member.

8. An assembly according to claim 6, wherein there are a plurality of teeth and a plurality of slots axially extending from said cooperating surfaces for engagement therebetween.

* * * * *